US006679042B1

(12) United States Patent
Schrag et al.

(10) Patent No.: US 6,679,042 B1
(45) Date of Patent: Jan. 20, 2004

(54) INFEED CUTTER BALER HAVING INCREASED THROUGHPUT

(75) Inventors: Thomas G. Schrag, Hesston, KS (US); Edward W. Esau, Hesston, KS (US); Keith O'Halloran, Hesston, KS (US)

(73) Assignee: ACCO Corporation, Duluth, GA (US)

( * ) Notice: Subject to any disclaimer, the term of this patent is extended or adjusted under 35 U.S.C. 154(b) by 0 days.

(21) Appl. No.: 10/293,388

(22) Filed: Nov. 12, 2002

(51) Int. Cl.$^7$ .............................................. A01D 39/00
(52) U.S. Cl. ........................................................ 56/341
(58) Field of Search ........................... 56/438, 440, 341, 56/443, 446, 455, 344, 364, 432, DIG. 20; 100/88, 189, 179, 240

(56) References Cited

U.S. PATENT DOCUMENTS

| | | |
|---|---|---|
| 1,733,839 A | 10/1929 | Taylor |
| 3,324,639 A | 6/1967 | Halls et al. |
| 3,412,535 A | 11/1968 | Drummond |
| 3,503,190 A | 3/1970 | Lely |
| 3,555,796 A | 1/1971 | Baumeister |
| 3,780,506 A | 12/1973 | Tashiro |
| 3,982,383 A | 9/1976 | Mott |
| 4,185,445 A | 1/1980 | vander Lely |
| 4,473,993 A | 10/1984 | Jennings et al. |
| 4,550,554 A | 11/1985 | Lundahl et al. |
| 4,637,201 A | 1/1987 | Pruitt et al. |
| 4,747,260 A | 5/1988 | Petrasch et al. |
| 4,869,003 A | 9/1989 | O'Loughlin |
| 5,005,342 A | 4/1991 | Lundahl et al. |
| 5,326,320 A | 7/1994 | von Allwoerden |
| 5,778,644 A | 7/1998 | Keller et al. |
| 5,782,559 A | 7/1998 | Neier et al. |
| 5,842,335 A * | 12/1998 | Esau ............................ 56/341 |
| 6,058,688 A | 5/2000 | Krambeck et al. |
| 6,062,010 A | 5/2000 | Kraus et al. |
| 6,295,797 B1 * | 10/2001 | Naaktgeboren et al. ........ 56/364 |
| 6,298,646 B1 * | 10/2001 | Schrag et al. .................. 56/341 |
| 6,385,952 B1 * | 5/2002 | Bergkamp et al. ............. 56/341 |

* cited by examiner

Primary Examiner—Robert E. Pezzuto
(74) Attorney, Agent, or Firm—Hovey Williams LLP

(57) ABSTRACT

A wide pickup header on the baler picks up windrows that are signficantly wider than the centrally disposed inlet of a passage containing cutter apparatus that reduces the materials into smaller pieces for compaction into a bale. In order to provide smooth, even, continuous flow of crop materials into and through the cutter apparatus at the inlet, the pickup is provided with a pair of lower, upturning stub augers on opposite sides of the inlet and a full length, downturning top auger spaced above and somewhat forwardly of the stub augers. The top auger not only assists the stub augers in consolidating the wide windrow of materials in toward the center of the machine but also keeps the stream fairly low and concentrated at a level where the stream is readily accepted by the rotary cutter apparatus. Preferably, the top auger maintains the inflowing crop stream below the axis of rotation of the cutter rotor so that prongs of the rotor engage the crop material as the prongs are rotating downwardly and rearwardly through the inlet and into the cutting zone. Preferably, the top auger rotates considerably faster than the stub augers and consolidates materials at a faster rate than the stub augers.

43 Claims, 4 Drawing Sheets

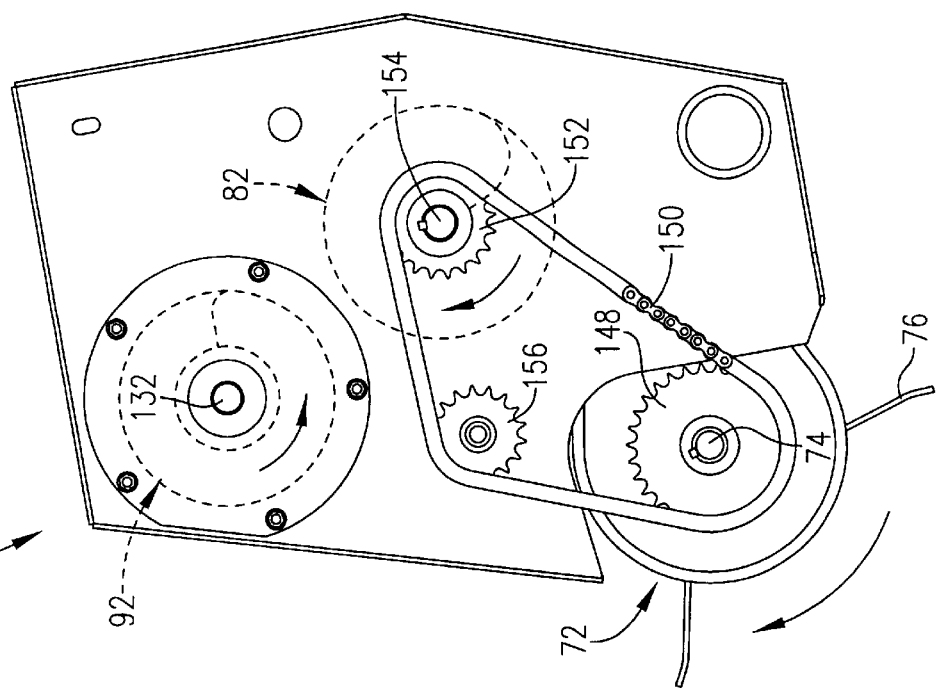

INFEED CUTTER BALER HAVING INCREASED THROUGHPUT

TECHNICAL FIELD

The present invention relates to crop balers, such as large rectangular balers, equipped with infeed cutter apparatus immediately behind the pickup header to reduce incoming crop materials into smaller pieces before the materials are packed into a bale by other mechanism in the machine. More particularly, the present invention pertains to a way of dramatically increasing the throughput of such balers notwithstanding the presence of such cutter apparatus within the flow path of crop materials through the baler.

BACKGROUND AND SUMMARY

It is known in the art to provide a large rectangular baler with cutter apparatus adjacent the leading end of a tubular passage through which picked up crop materials are compacted into charges and then delivered into the main baling chamber of the machine. See for example U.S. Pat. No. 6,298,646 assigned to the assignee of the present invention, which is hereby incorporated by reference into the present specification.

One problem encountered with cutter balers of this type relates to the fact that the main baling chamber, which is generally horizontally disposed and extends fore-and-aft in line with the path of travel of the machine, is typically narrower than the width of the crop windrow picked up by the wide pickup header of the machine. This necessitates consolidating the over-width stream of picked up materials prior to its entry into the narrower transfer passage that leads to and corresponds in width to the baling chamber. Cutter apparatus positioned in the mouth or inlet of the passage is thus presented with a large consolidated mass of materials to deal with, rather than a thin, spread-out stream.

While various methods of consolidating the picked up materials into a narrower stream have been used in cutter balers over the years, prior efforts in this regard have not been totally satisfactory, often resulting in reduced throughput from a machine that, without the cutter apparatus, is capable of significantly greater productivity. Productivity shortfalls have been suffered not only in high moisture conditions on the one hand and light, dry crop conditions on the other, but in ideal crop conditions as well.

Prior to the present invention, one line of conventional wisdom was that the presence of the cutter apparatus in the flow passage created a type of restriction in the flow path that simply could not handle the extra volume of materials created by the consolidating action of the pickup, even though the compacting and feeding mechanism disposed behind the cutter apparatus could handle that volume with relative ease. While lower stub augers positioned on opposite outboard sides of the inlet of the flow passage were quite successful in consolidating outer portions of the picked up windrow into fore-and-aft alignment with the inlet, there was a tendency for the center-gathered materials to simply bunch up and lose momentum at the mouth of the inlet rather than to flow smoothly into and through the cutter apparatus. Thus, it was thought that efforts should be concentrated in somehow relieving the choke point or restriction created by the cutter apparatus itself so that materials could more easily flow through the cutter. Focusing on the cutter and its confined space as the source of the problem, however, now appears to have been a mistake.

It has now been discovered that the problem lies not in the fact that the volume of materials presented to the cutter apparatus is large, but rather in the way such volume is presented. Generally speaking, in the present invention, instead of allowing the centrally gathered materials to boil up and lose momentum just ahead of the inlet and cutter apparatus, the center gathered materials are kept under control with an overhead confining force at the critical transition point in front of the cutter apparatus. In a preferred embodiment, this is accomplished by providing an overhead, downturning top auger that spans the full width of the pickup header above a pair of upturning stub augers on opposite sides of the inlet. Preferably, the cutter apparatus includes a downturning rotor having an axis of rotation located just behind the inlet and with generally radially projecting prongs that reach out slightly through the inlet as they sweep down across front portion of their path of travel. Best results have been obtained where the top auger is low enough to keep the incoming flow of crop materials below the axis of rotation of the cutter rotor. Thus, instead of rejecting the inflowing materials, the rotor prongs moving downwardly and rearwardly in a lower quadrant of their path of travel tend to readily accept the materials and move them through the cutting zone of the passage. Even though the auger flighting on the full length top auger is not generally considered to be particularly effective in feeding crop materials laterally of the auger, in this particular application, and by positioning the auger relatively low with respect to the cutter rotor, the flighting seems to have just enough ability to keep the materials moving laterally through the transition zone and into the grasp of the rotor to provide a relatively'smooth, constantly moving inflow of materials to the cutter rotor and a consequent significant increase in overall throughput of the machine. Preferably, the top auger is adapted to move the materials it engages toward the center at a faster transverse speed than the stub augers so that a kind of separating action is obtained by the top auger.

BRIEF DESCRIPTION OF THE DRAWINGS

FIG. 4 is a schematic right end elevational view of the pickup with shielding removed to illustrate details of the drive arrangement at that end of the pickup; and FIG. 5 is a schematic left end elevational view of the pickup with shielding removed to show details of construction of drive components at that location.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
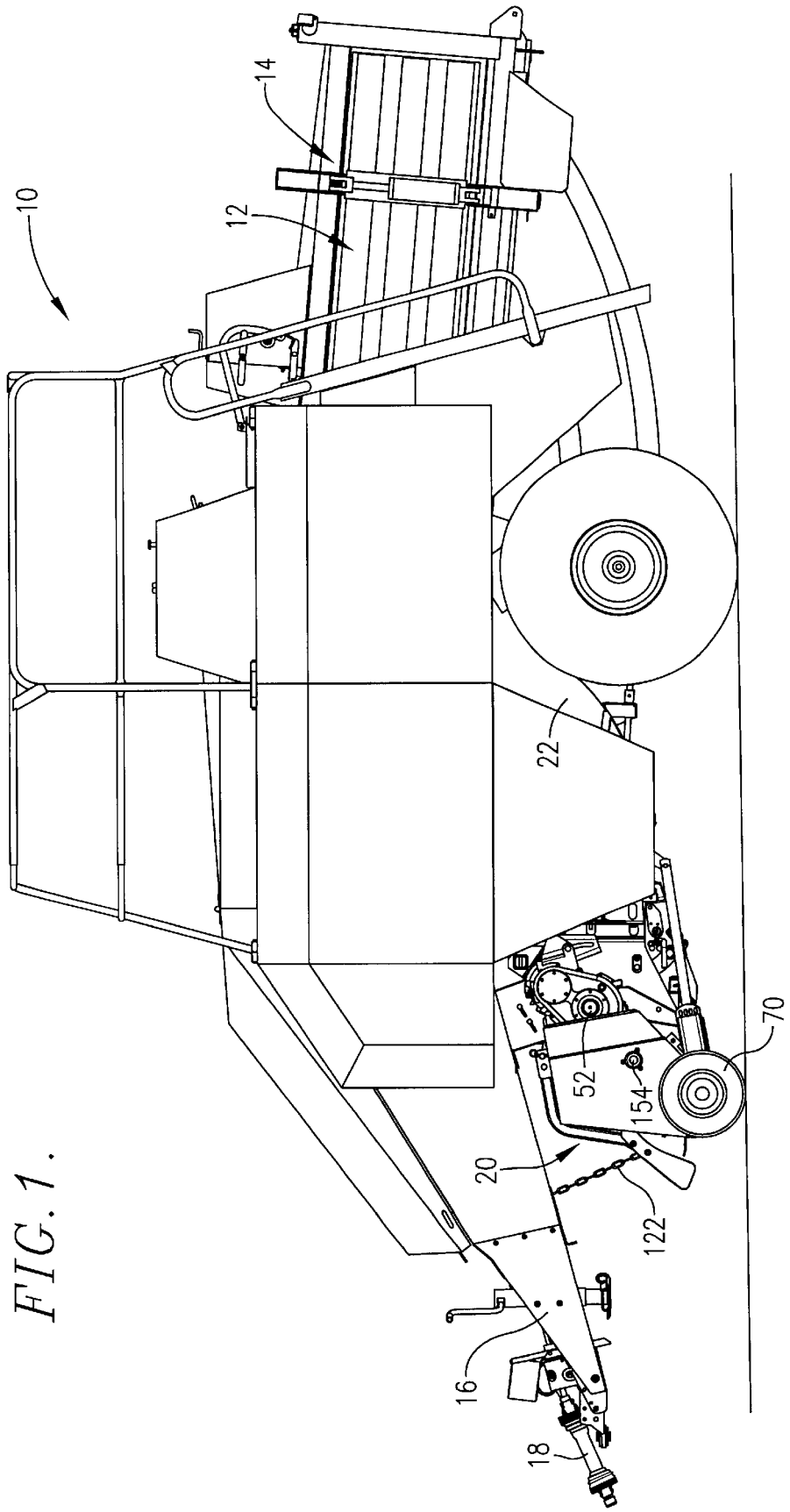
FIG. 1 is a side elevational view of a baler constructed in accordance with the principles of the present invention.

The baler 10 illustrated in FIG. 1 has a fore-and-aft extending baling chamber denoted generally by the numeral 12 within which bales of crop material are prepared and forced incrementally out the back end of chamber 12. In the particular illustrated embodiment, baler 10 is an "extrusion" type baler in which the bale discharge orifice at the rear of the baler is generally smaller than upstream portions of the baling chamber such that the restrictive nature of the discharge orifice provides back pressure against which a reciprocating plunger within the baling chamber can act to compress charges of crop materials into a bale. The dimensions of the discharge orifice and the squeeze pressure on the bales at that location are controlled by mechanism broadly denoted by the numeral 14 in FIG. 1. Baler 10 is hitched to a towing vehicle (not shown) by a fore-and-aft tongue 16, and power for operating the various components of the baler is supplied through a drive line 18 supported by tongue 16.

Baler 10 is an "in-line" type of baler wherein crop material is picked up below and slightly ahead of baling chamber 12 and then loaded up into the bottom of chamber 12 in a straight line path of travel as viewed in top plan. In keeping with the in-line principle, baler 10 has a pickup or pickup header 20 positioned under tongue 16 and aligned vertically with baling chamber 12 in a lateral sense, the pickup 20 being located somewhat forwardly of chamber 12. A duct 22 barely visible in FIG. 1 but shown fully in FIG. 2 extends generally rearwardly and upwardly from behind pickup 20 to an opening 24 (FIG. 2) in the bottom of baling chamber 12. A plunger 26 reciprocates within chamber 12 in compression and retraction strokes across opening 24. When fully retracted, plunger 26 uncovers opening 24, and when fully extended, plunger 26 completely closes off opening 24 and is positioned somewhat rearwardly beyond the rear extremity of opening 24.

Duct 22 serves as part of a passage broadly denoted by the numeral 28 through which crop materials travel from pickup 20 to baling chamber 12 during operation of the machine. Passage 28 commences at the rear of pickup 20 in an inlet 30 that is located in the rear wall of pickup 20 (see also FIG. 3). As crop materials move rearwardly from pickup 20 and into passage 28, they pass through a cutting zone 32 immediately behind pickup 20, then a packing zone 34 behind cutting zone 32, and finally an accumulating zone 36 behind packing zone 34. Within cutting zone 32, the crop materials are cut into smaller pieces, while within the packing zone 34 the materials have a packing and feeding force applied to them in the downstream direction of flow, and within the accumulating zone 36 the materials accumulate into a charge that is compressed by the packing force such that the charge assumes the configuration of duct 22 in that region. As will be seen, the principles of the present invention that involve special relationships at the infeed area of the machine adjacent inlet 30 of passage 28 do not require the presence of packing, accumulating and stuffing in the manner disclosed by the particular embodiment illustrated in the drawings. Moreover, although the principles of the present invention are described herein in connection with a rectangular baler, it is believed that certain aspects may apply to round balers as well, if equipped with rotary infeed cutters at the mouth of a narrow transfer passage.

To carry out the cutting function within cutting zone 32 the baler includes cutter apparatus broadly denoted by the numeral 38. The packing function within packing zone 34 is carried out by packer mechanism 40. After the charge has accumulated and been properly formed within accumulating zone 36, a stuffer 42, operating through successive stuffing cycles, sweeps the charge up into baling chamber 12 through opening 24 when plunger 26 is retracted. Although stuffer 42 may operate non-stop in successive stuffing cycles, it may also be provided with a control including a sensor plate 44 in the bottom wall of duct 22 that causes stuffer 42 to dwell after the completion of a stuffing stroke if the charge accumulating within zone 36 has not yet reached the desired density by the time stuffer 42 is ready to commence the next stuffing cycle.

Cutter apparatus 38 comprises three primary components, i.e., a rotor 46, a bank of strippers 48 for rotor 46, and a knife bed 50 cooperating with rotor 46 to sever crop materials into smaller pieces. Rotor 46 is adapted for rotation about a transverse axis denoted by the numeral 52 and includes a cylindrical tubular hub 54 concentric with axis 52. A series of generally star-shaped blades 56 are affixed to hub 54 along the length thereof (only a pair of blades 56 being illustrated) at spaced intervals. Each blade 56 has four points or prongs 58 located at 90° intervals. The blades 56 are arranged in pairs along the length of hub 54 such that the prongs 58 of the two blades in each pair are in aligned, transverse registration with one another. Adjacent pairs of the blades, however, are slightly offset circumferentially from one another so that the prongs 58 present a slow, spiral pattern along the length of rotor 46. Rotor 46 is driven in a counterclockwise direction viewing FIG. 2 such that prongs 58 sweep downwardly into cutting zone 32 on the front side of axis of rotation 52, rearwardly through cutting zone 32 below axis of rotation 52, and upwardly and rearwardly out of cutting zone 32 behind axis of rotation 52. Front portions of rotor 46 move downwardly and rearwardly during rotation of rotor 46. The strippers 48 are interspersed between adjacent blades 56 in a known manner, such as that disclosed in the incorporated U.S. Pat. No. 6,298,646.

Knife bed 50 includes a series of laterally spaced apart knives 60 that are interspersed between blades 56 of rotor 46 along the length of the later. As disclosed in detail in the incorporated U.S. Pat. No. 6,298,646, knives 60 can be selectively raised and lowered into and out of cutting zone 32 so as to change the length of cut or to adapt the machine for no cutting at all when all of the knives 60 are dropped down out of the cutting zone. Knives 60 are spring-loaded so as to provide relief in the event that obstructions such as rocks and other foreign objects are accidentally introduced into cutting zone 32.

Figure 2:
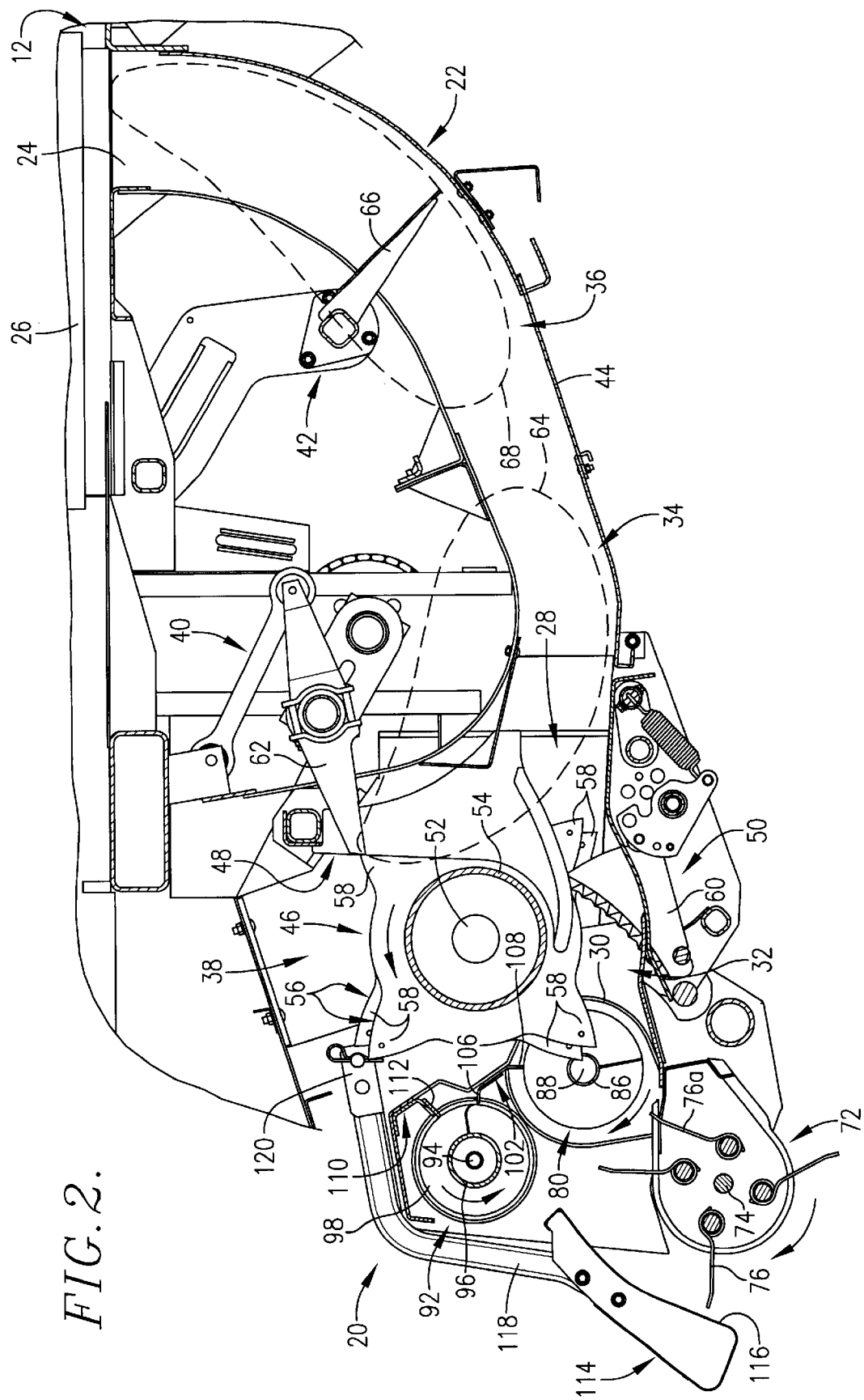
FIG. 2 is an enlarged, fragmentary, longitudinal cross sectional view through the infeed portion of the baler illustrating relationships between various components of the machine in that region.

Packer assembly 40 is of known construction as illustrated in the incorporated '646 Patent and includes multiple sets of forks 62 that move through generally kidney-shaped paths of travel as illustrated by the phantom lines 64 in FIG. 2. Forks 62 are disposed to sweep downwardly through certain of the blades 56 of rotor 46 on its rear side as the prongs 58 are sweeping upwardly out of cutting zone 32. This action of forks 62 helps pull crop materials from rotor 46 and positively feed them rearwardly into downstream portions of duct 22.

Stuffer 42 comprises a large fork 66 having a multiplicity of tines that are spaced apart across the width of duct 22. The top wall of duct 22 is slotted to permit entry and egress of the tines of fork 66 in a known manner, such tines moving along their own kidney-shaped path of travel denoted by the numeral 68. A set of retaining hooks or the like (not shown) may be positioned at the upper end of duct 22 just below opening 24 for the purpose of preventing portions of an accumulated charge from entering bale chamber 12 during a dwell cycle of stuffer 42.

Pickup header 20 is mounted to the main frame of the baler by means not shown for up and down pivoting movement about the axis 52 of rotor 46. Ground wheels 70 (FIG. 1) at opposite ends of the pickup ride along the ground as the baler advances and allow the pickup to rise and fall relative to the rest of the baler as changes in terrain are encountered. Components of pickup 20 thus swing in an arc about rotary axis 52 during such changes in terrain.

Pickup 20 includes a retracting finger reel 72 of known design, such reel 72 rotating in a clockwise direction viewing FIG. 2 about an axis 74. Fingers 76 of reel 72 operate within gaps defined between elongated, curved, laterally spaced apart wrapper strips 78 to lift windrowed material off the ground and propel it generally toward the rear of pickup header 20. As illustrated by the finger 76a in FIG. 2, fingers 76 are controlled in such a manner during rotation of reel 72 that they retract generally vertically at the rear ends of their path of travel down out of the crop material to have the most effective release of such material. Such release of the crop materials by fingers 76 occurs somewhat forwardly of inlet 30 of passage 28 so that fingers 76 do not themselves provide a particularly positive means for controlling and feeding the crop materials into inlet 30.

Figure 3:
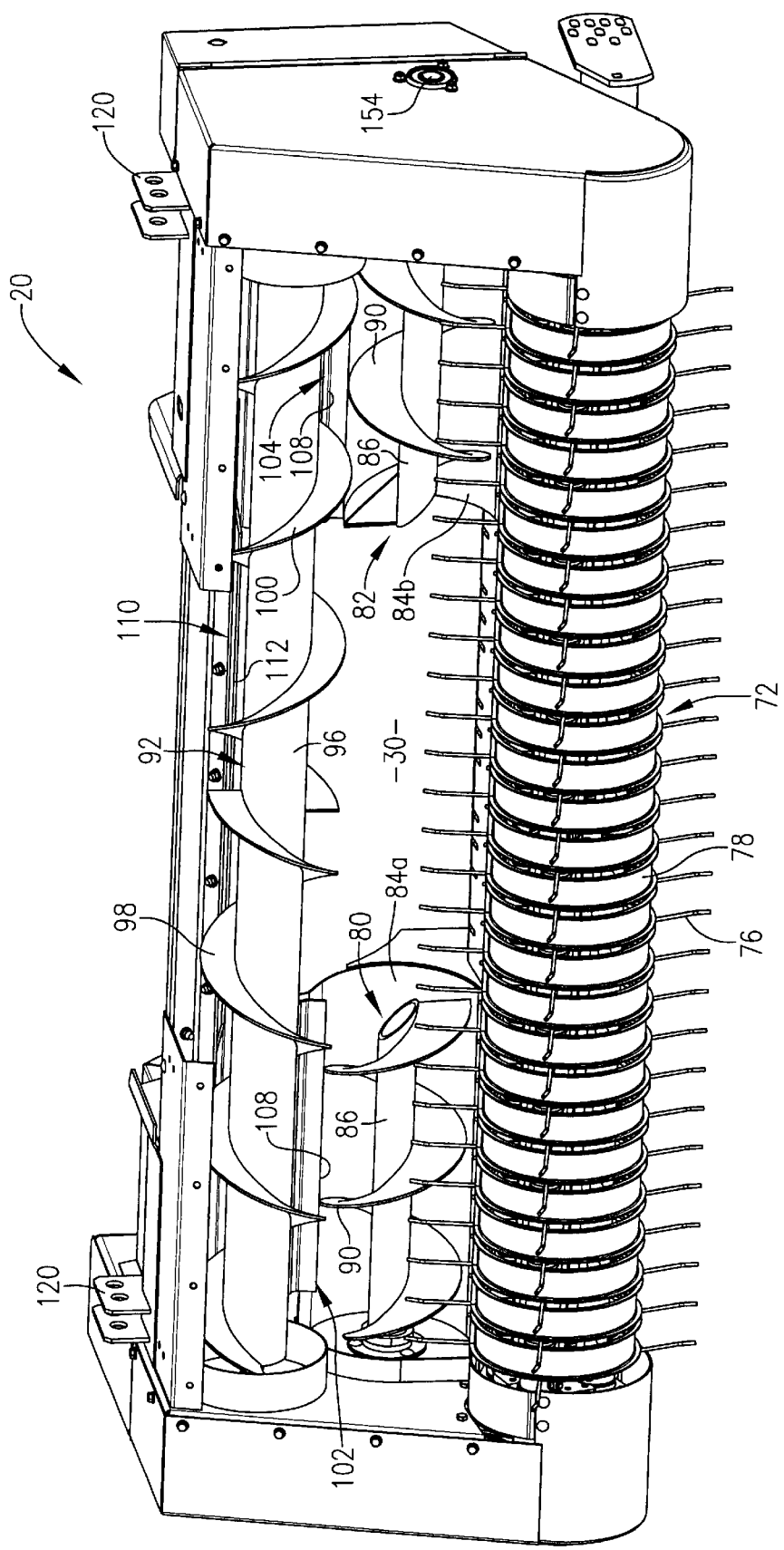
FIG. 3 is a left front isometric view of the pickup header detached from the rest of the machine and with the wind guard removed to reveal details of construction.

As illustrated in FIG. 3, inlet 30 is considerably narrower than the full width of pickup header 20. Consequently, the windrowed materials picked up by pickup 20 must be consolidated centrally in order to pass through inlet 30. Such central consolidation is accomplished in part by a pair of lower stub augers 80 and 82 that are mutually axially aligned and are positioned on opposite outboard sides of inlet 30. Each stub auger 80, 82 has its outboard end located at the outer extreme of the pickup reel 72 and its inboard end located immediately adjacent the corresponding edge of inlet 30. Preferably, stub augers 80, 82 are upturning augers such that their front portions move upwardly and rearwardly during operation. It will be noted that stub augers 80, 82 are situated immediately in front of curved rear wall portions 84a and 84b of header 20, such wall portions 84a and 84b being generally concentric with stub augers 80 and 82.

Each stub auger 80, 82 has a central core or tube 86 defining an axis of rotation 88, and each stub auger 80, 82 is also provided with helical flighting 90 wrapped around tube 86 and extending along the full length thereof. Flighting 90 on stub auger 80 is so configured that it conveys crop materials inwardly toward inlet 30 as stub auger 80 rotates and, correspondingly, flighting 90 on stub auger 82 is so configured as to convey material inwardly toward inlet 30 when stub auger 82 is rotated.

Pickup header 20 also includes a full length top auger 92 spaced above stub augers 80, 82 and spanning the full width of pickup reel 72 across inlet 30 and to the outboard ends of rear wall portions 84a and 84b. Top auger 92 is counter-rotated relative to stub augers 80, 82 such that its front portions move downwardly and rearwardly during operation, i.e., in a counterclockwise direction viewing FIG. 2. Top auger 92 is rotatable about a transverse axis 94 and extends parallel to the axis 88 of stub augers 80, 82. A cylindrical core or tube 96 of top auger 92 is concentric to axis 94 and carries two sets of auger flighting 98 and 100 leading inwardly from opposite ends of top auger 92. Flighting sets 98 and 100 are respectively configured and arranged to feed or convey materials centrally of pickup header 20 as top auger 92 rotates during operation.

Top auger 92 and stub augers 80, 82 are all of approximately the same diameter across the outer peripheral edges of their respective flighting. However, it will be noted that the tubes 86 of stub augers 80, 82 are smaller in diameter than the tube 96 of top auger 92. In a preferred embodiment, auger tube 96 of top auger 92 is approximately twice the diameter of auger tubes 86 of stub augers 80, 82. Conversely, the auger flights 98, 100 of top auger 92 are approximately half as deep as flighting 90 of stub augers 80, 82. Furthermore, in a preferred form of the invention, top auger 92 rotates faster than stub augers 80, 82, preferably having a peripheral speed that is approximately double the peripheral speed of stub augers 80, 82. Preferably also, the lead pitch of the top auger flighting is greater than that of the stub augers so that top auger 92 separates materials it engages from those engaged by stub augers 80, 82 and advances such separate materials toward inlet 30 at a faster rate than the materials engaged by stub augers 80, 82.

In one exemplary embodiment, at 1000 rpm tractor PTO input, top auger 92 has a flighting lead pitch of 292 mm (11.5 inches) and is rotated at 479.1 rpm to produce a peripheral speed of 1033.5 feet/min. Stub augers 80, 82 have a flighting lead pitch of 225 mm (8.858 inches) and are rotated at 212.9 rpm to produce a peripheral speed of 493.8 feet/min. Top auger 92 thus has a peripheral speed that is approximately twice the peripheral speed of stub augers 80, 82. Furthermore, stub augers 80, 82 have a transverse speed of 1885.9 in/min, while top auger 92 has a transverse speed of 5509.7 in/min, almost three times faster. In the same embodiment, cutter rotor 46 is rotated at 106.5 rpm with a peripheral speed of 669.4 feet/min, while pickup reel 72 is rotated at 141.9 rpm with a peripheral speed of 692.7 feet/min at the tip of fingers 76.

Top auger 92 is positioned somewhat forwardly of lower stub augers 80, 82, with its axis of rotation 94 essentially directly above the point of release of incoming crop materials by retracting fingers 76 of pickup reel 72. Although the axis 94 of top auger 92 is essentially at the same level as rotor axis 52, the lowermost portion of the outer periphery of flighting 98, 100 is disposed below rotor axis 52. It is essentially level with the lowermost periphery of rotor hub 54 when pickup 20 is in its operating position as illustrated in FIGS. 1 and 2. The lower portion of tube 96 of top auger 92 is also disposed below rotor axis 52.

Top auger 92 is positioned as close as possible to rotor 46 without causing structural interference between the two devices. Accordingly, the path of travel of the circular outer periphery of flighting 98, 100 of top auger 92 is disposed in close proximity to the circular path of travel traced by the outermost tips of prongs 58 of rotor 46. It will be noted in this respect that although rotor axis 52 is disposed behind inlet 30, rotor 46 is so positioned that prongs 58 project forwardly through and beyond inlet 30 along the front portion of their path of travel. Thus, as illustrated in FIG. 2, prongs 58 of rotor 46 sweep downwardly between the spaced apart inboard ends of stub augers 80, 82 during rotation of rotor 46.

The pickup header 20 further includes a pair of stripper assemblies 102 and 104 between stub augers 80, 82 and top auger 92. As illustrated in FIG. 3, stripper assembly 102 is situated within the gap between stub auger 80 and top auger 92, while stripper assembly 104 is situated within the gap between stub auger 82 and top auger 92. As shown in FIG. 2 with respect to stripper assembly 102, each stripper assembly has an outturned, uppermost marginal edge 106, located in close proximity to the outer periphery of top auger 92, as well as an outturned, lower, outermost marginal edge 108 located in close proximity to the outermost periphery of the corresponding stub auger 80 or 82. The stripper assemblies 102 and 104 are thus generally reversely C-shaped as viewed in FIG. 2 and are mounted on the back wall of pickup header 20 in position to keep the crop materials from wrapping around the augers during operation. A top stripper assembly denoted by the numeral 110 spans inlet 30 across the top of the latter and behind top auger 92 for the purpose of stripping crop materials from the central portion of top auger 92 that would otherwise tend to wrap around such portion. Top stripper 110 includes a downwardly, outwardly and forwardly projecting blade 112 having an outermost edge in close proximity to the upper rear periphery of top auger 92.

As illustrated in FIGS. 1 and 2, pickup header 20 additionally includes a windguard 114 that is spaced above pickup reel 72 to confine and contain crop material as reel 72 is lifting such material off the ground and into the baler. In a preferred embodiment, windguard 114 includes a generally concavo-convex panel 116 that conforms generally to the arcuate configuration of the front of reel 72 and is located above and forwardly thereof. Panel 116 extends the full transverse width of reel 72 in spaced opposition thereto. A pair of support arms 118 at opposite ends of panel 116 extend upwardly and rearwardly therefrom to swingably attach panel 116 to upstanding brackets 120 at the upper rear extremity of pickup header 20. Windguard 114 is gravity-biased to its lowered position of FIG. 2, but is limited in such movement by a limit chain 122 shown in FIG. 1.

FIGS. 4 and 5 illustrate drives for rotor 46, stub augers 80, 82, top auger 92 and pickup reel 72. Referring initially to FIG. 4, a shaft 124 receives input driving power from the cutter rotor 46 causing shaft 124 to rotate in a clockwise direction viewing FIG. 4. Shaft 124 is concentric with rotor axis 52. A large sprocket 126 fixed to shaft 124 drives an endless chain 128 that entrains a small sprocket 130 on the end of a shaft 132 associated with top auger 92. Chain 128 thus drives top auger 92 in a clockwise direction viewing FIG. 4. An adjustable idler sprocket 134 engages the backside of chain 128 to provide tension thereto, and chain 128 loops under and is entrained around another idler sprocket 136 a substantial distance below sprocket 130 of top auger 92. From idler 136, chain 128 is backwrapped around a sprocket 138 fixed to the end of a shaft 140 associated with lower stub auger 80, thus causing stub auger 80 to rotate in a counterclockwise direction viewing FIG. 4, oppositely of top auger 92.

Shaft 140 also carries a second sprocket 142 outboard of sprocket 138. Outer sprocket 142 is, in turn, entrained by an endless drive chain 144 that extends downwardly and forwardly and is looped around a sprocket 146 fixed to the shaft 74 defining the rotational axis of reel 72. Thus, reel 72 is rotated in a counterclockwise direction viewing FIG. 4. An adjustable idler 146 supplies tension for chain 144.

Referring to FIG. 5, shaft 74 of reel 72 extends the full width of reel 72 and has a sprocket 148 affixed thereto at its left end. An endless drive chain 150 is entrained around sprocket 148 and around a sprocket 152 fixed to the outer end of a shaft 154 of lower stub auger 82. Thus, chain 150 drives lower stub auger 82 in a clockwise direction viewing FIG. 5, counter to top auger 92. An idler 156 tensions chain 150.

OPERATION

As the baler traverses a field having a windrow of crop materials lying on the ground, pickup 20 engages the windrow and lifts the materials up off the ground beneath the windguard 114. Typically, the windrow will be significantly wider than the inlet 30 such that picked up material is presented to the topside of reel 72 clear across the full width of pickup 20.

As the materials are lifted and flung rearwardly by pickup fingers 76, they are presented to the lower stub augers 80, 82 and the counter-rotating top auger 92 and are immediately subjected to the central consolidating action generated by the flighting of such augers. Because stub augers 80, 82 are upturning, the crop materials stay in front of stub augers 80, 82 and tend to be lifted slightly thereby, as opposed to being conveyed down along the bottom portions of stub augers 80, 82. However, the materials are not allowed to migrate upwardly to any significant extent, despite the upturning nature of stub augers 80, 82, because the materials immediately encounter the downturning top auger 92. Top auger 92 thus controls the crop materials and keeps them relatively low within the infeed area of pickup 20.

The stub augers 80, 82 force the outboard portions of the crop flow centrally toward inlet 30, but this effort is augmented by top auger 92. Moreover, because top auger 92 is preferably rotating considerably faster than stub augers 80, 82 and the pitch of the flighting of top auger 92 is considerably greater than that of stub augers 80, 82, top auger 92 tends to separate and pull materials centrally at a faster rate than stub augers 80, 82. This helps maintain a constant, even flow of materials from the outboard regions of the pickup in toward the center, and thence rearwardly through inlet 30. Flights 98 and 100 on top auger 92 across the inlet 30 are particularly helpful in propelling the materials of the flowing stream rearwardly into the cutting zone 32 behind inlet 30.

It will be appreciated that within the cutting zone 32, the flow passage 28 is limited at its top extremity by the bottom circumferential portion of drum 54 of rotor 46. Thus, inlet 30 is somewhat restricted in a vertical sense in this area. However, by having top auger 92 positioned fairly low within the infeed area, crop materials that might otherwise boil up in front of stub augers 80, 82 and inlet 30 are held down and encouraged to move rearwardly through inlet 30 and beneath rotor drum 54. With the lower periphery of top auger 92 disposed below the axis of rotation 52 of rotor 46, and with the lower portion of auger tube 96 likewise being positioned below axis 52, the crop materials are delivered to rotor 46 in a region where prongs 58 are moving downwardly and rearwardly, rather than downwardly and forwardly. Consequently, rotor 46 tends to readily accept the crop materials, rather than reject them.

This greatly enhances smooth, even, and constant flow of materials from pickup 20 to and through the cutting zone 32 so that the capacity of this infeed area of the baler can match the capacity of the rest of the machine. Consequently, improved overall throughput of the baler is achieved. Such improved throughput is obtained in all crop conditions.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. In a rectangular baler having a fore-and-aft, generally horizontally extending baling chamber, a plunger reciprocable within said chamber in compression and retraction strokes, and an opening in the bottom of the baling chamber through which charges of crop material are introduced into the chamber between compression strokes of the plunger, the improvement comprising:
   a pickup for lifting crop materials off the ground as the baler advances;
   structure defining a passage leading from the pickup to the opening in the bottom of the baling chamber,
   said passage including an inlet for receiving materials from the pickup; and
   cutter apparatus at said inlet for reducing crop materials received from the pickup into smaller pieces,
   said inlet being transversely narrower than the width of the pickup,
   said pickup including a pair of transversely extending, axially aligned, and axially spaced apart lower stub augers positioned on opposite lateral sides of said inlet for consolidating picked up crop materials centrally toward the inlet from opposite, laterally outboard areas of the pickup,
   said stub augers being driven in such a direction that front portions of the stub augers move generally upwardly and rearwardly during operation,
   said pickup further including a full-length, transversely extending top auger spaced above said stub augers and spanning said inlet from an outboard end of one stub auger to an outboard end of the other stub auger,
   said top auger being configured to consolidate crops centrally and being counter-rotated relative to the stub augers such that front portions of the top auger move generally downwardly and rearwardly during operation to assist in delivering crop materials to the cutter apparatus.

2. In a rectangular baler as claimed in claim 1,
   said cutter apparatus including a rotor driven about a transverse axis in such a direction that front portions of the rotor move generally downwardly and rearwardly during operation.

3. In a rectangular baler as claimed in claim 2,
   said rotor including a plurality of generally radially projecting prongs.

4. In a rectangular baler as claimed in claim 1,
   said pickup further including a retracting finger reel and a windguard cooperating with said reel,
   said windguard including a section of sheet material contoured generally complementally to said reel and located above the reel in spaced opposition thereto.

5. In a rectangular baler as claimed in claim 1,
   the axis of rotation of said top auger being disposed above and forwardly of the axis of rotation of said stub augers.

6. In a rectangular baler as claimed in claim 1,
   said cutter apparatus including a rotor having a transverse axis of rotation disposed behind the inlet and driven in such a direction that forward portions of the rotor move generally downwardly and rearwardly during operation,
   said rotor including a plurality of generally radially outwardly projecting prongs,
   said prongs projecting forwardly through said inlet during a portion of their path of travel.

7. In a rectangular baler as claimed in claim 6,
   said top auger including flighting having a radially outermost, generally cylindrical periphery provided with a lower portion that projects below the axis of rotation of the rotor.

8. In a rectangular baler as claimed in claim 7,
   said top auger having a cylindrical core about which the flighting is wound,
   said core having a radially outermost, cylindrical periphery provided with a lower portion that projects below the axis of rotation of the rotor.

9. In a rectangular baler as claimed in claim 8,
   said rotor having a cylindrical hub having an outermost cylindrical periphery,
   the lower portion of the cylindrical periphery of the top auger flighting being disposed at generally the same level as the lower portion of the cylindrical periphery of the hub.

10. In a rectangular baler as claimed in claim 7,
    said path of travel of the rotor prongs being in close proximity to the outer periphery of the top auger flighting.

11. In a rectangular baler as claimed in claim 1,
    said top auger and said lower stub augers each having a generally cylindrical core and flighting wound around said core,
    said core of the top auger being larger in diameter than the cores of the stub augers.

12. In a rectangular baler as claimed in claim 11,
    the flighting of said top auger being radially shallower than the flighting of the stub augers.

13. In a rectangular baler as claimed in claim 1,
    said top auger being driven at a faster peripheral speed than the lower, stub augers.

14. In a rectangular baler as claimed in claim 13,
    said top auger being driven at approximately twice the speed of the lower, stub augers.

15. In a rectangular baler as claimed in claim 1, said pickup further including a stripper assembly located in a gap between each stub auger and the top auger in disposition to prevent crop materials from passing through the gap and wrapping around the top auger and the stub augers.

16. In a rectangular baler as claimed in claim 15, said pickup further including an upper stripper for the top auger spanning said inlet and disposed on the upper rear side of the top auger.

17. In a rectangular baler as claimed in claim 1, further comprising a packer positioned downstream from the cutter apparatus for receiving reduced materials in the passage from the cutter apparatus and applying a packing force thereto generally in the downstream direction to form a charge.

18. In a rectangular baler as claimed in claim 17, further comprising a stuffer separate from said packer and operable through periodic loading cycles to load a charge from the packer up into the baling chamber.

19. In a rectangular baler as claimed in claim 18, said stuffer having control mechanism operably associated therewith for temporarily deactivating the stuffer in the event a charge accumulating in the passage has failed to reach a predetermined density by the start of the next loading cycle of the stuffer.

20. In a baler having a pickup for lifting crop materials off the ground as the baler advances, an inlet narrower than the width of the pickup for receiving materials from the pickup, and cutter apparatus adjacent said inlet for reducing crop materials received from the pickup into smaller pieces, said cutter apparatus including a rotor driven in such a direction about a transverse axis of rotation behind said inlet that front portions of the rotor move generally downwardly and rearwardly during operation, the improvement comprising:

said pickup including a pair of transversely extending, axially aligned, and axially spaced apart lower stub augers positioned on opposite lateral sides of said inlet for consolidating picked up crop materials centrally toward the inlet from opposite, laterally outboard areas of the pickup, said stub augers being driven in such a direction that front portions of the stub augers move generally upwardly and rearwardly during operation, said pickup further including a full-length, transversely extending top auger spaced above said stub augers and spanning said inlet from locations outboard of the inlet, said top auger being configured to consolidate crops centrally and being counter-rotated relative to the stub augers such that front portions of the top auger move generally downwardly and rearwardly during operation to assist in delivering crop materials to the cutter apparatus.

21. In a crop baler as claimed in claim 20, said baler comprising a rectangular baler having a fore-and-aft, generally horizontally extending baling chamber, a plunger reciprocable within said chamber in compression and retraction strokes, an opening in the bottom of the baling chamber through which charges of crop material are introduced into the chamber between compression strokes of the plunger, and structure defining a passage leading from the inlet to the opening in the bottom of the baling chamber.

22. In a crop baler as claimed in claim 21, further comprising a packer positioned downstream from the cutter apparatus for receiving reduced materials in the passage from the cutter apparatus and applying a packing force thereto generally in the downstream direction to form a charge.

23. In a crop baler as claimed in claim 22, further comprising a stuffer separate from said packer and operable through periodic loading cycles to load a charge from the packer up into the baling chamber.

24. In a crop baler as claimed in claim 23, said stuffer having control mechanism operably associated therewith for temporarily deactivating the stuffer in the event a charge accumulating in the passage has failed to reach a predetermined density by the start of the next loading cycle of the stuffer.

25. In a crop baler as claimed in claim 20, said rotor including a plurality of generally radially projecting prongs.

26. In a crop baler as claimed in claim 20, the axis of rotation of said top auger being disposed forwardly of the axis of rotation of said stub augers.

27. In a crop baler as claimed in claim 20, said top auger including flighting having a radially outermost, generally cylindrical periphery provided with a lower portion that projects below the axis of rotation of the rotor.

28. In a crop baler as claimed in claim 27, said top auger having a cylindrical core about which the flighting is wound, said core having a radially outermost, cylindrical periphery provided with a lower portion that projects below the axis of rotation of the rotor.

29. In a crop baler as claimed in claim 28, said rotor having a cylindrical hub having an outermost cylindrical periphery, the lower portion of the cylindrical periphery of the top auger flighting being disposed at generally the same level as the lower portion of the cylindrical periphery of the hub.

30. In a crop baler as claimed in claim 20, said top auger and said lower stub augers each having a generally cylindrical core and flighting wound around said core, said core of the top auger being larger in diameter than the cores of the stub augers.

31. In a crop baler as claimed in claim 30, the flighting of said top auger being radially shallower than the flighting of the stub augers.

32. In a crop baler as claimed in claim 20, said top auger being driven at a faster peripheral speed than the lower, stub augers.

33. In a crop baler as claimed in claim 32, said top auger being driven at approximately twice the speed of the lower, stub augers.

34. A method of baling crop materials comprising the steps of:

picking up severed crop materials from the ground in a stream that is wider than an inlet through which the stream is to pass;

consolidating the stream of picked up materials centrally until its width corresponds to that of the inlet, said consolidating step being carried out using a pair of lower, upturning, axially spaced and transversely extending stub augers on opposite lateral sides of the inlet and a full length, downturning, transversely extending top auger spaced above said stub augers and spanning said inlet from opposite end locations disposed outboard of said inlet;

passing the consolidated stream of crop materials from the stub augers and top auger through said inlet to cutter apparatus;

reducing the crop materials in the consolidated stream into smaller pieces using the cutter apparatus; and forming the reduced crop materials into a bale.

35. A method of baling crop materials as claimed in claim 34, said forming step comprising the step of forming the reduced crop materials into a rectangular bale.

36. A method of baling crop materials as claimed in claim 35, said forming step further including the steps of packing the reduced crop materials into a charge and then stuffing the charge into a baling chamber in which a reciprocating plunger compacts the charge against other compacted charges to form the bale.

37. A method of baling crop materials as claimed in claim 34, said cutter apparatus including a rotor having a transverse axis of rotation, said consolidating step including using the top auger to keep the consolidated stream of materials below said axis of rotation of the rotor while the consolidated stream is in front of the rotor.

38. A method of baling crop materials as claimed in claim 37, said consolidating step further including rotating the top auger at a peripheral speed that exceeds the peripheral speed of the stub augers.

39. A method of baling crop materials as claimed in claim 38, said top auger being rotated at approximately twice the peripheral speed of the stub augers.

40. A method of baling crop materials as claimed in claim 39, said top auger having flighting that consolidates materials centrally at a faster rate than flighting on the stub augers.

41. A method of baling crop materials as claimed in claim 34, said top auger having flighting that consolidates materials centrally at a faster rate than flighting on the stub augers.

42. A method of baling crop materials as claimed in claim 34, said consolidating step further including rotating the top auger at a peripheral speed that exceeds the peripheral speed of the stub augers.

43. A method of baling crop materials as claimed in claim 42, said top auger being rotated at approximately twice the peripheral speed of the stub augers.

\* \* \* \* \*